(12) United States Patent
Yoshida et al.

(10) Patent No.: US 9,097,218 B2
(45) Date of Patent: Aug. 4, 2015

(54) CANISTER

(71) Applicant: MAHLE FILTER SYSTEMS JAPAN CORPORATION, Tokyo (JP)

(72) Inventors: Hiroyuki Yoshida, Saitama (JP); Takashi Hasumi, Nishitokyo (JP); Toshinobu Horimatsu, Kawagoe (JP); Junpei Omichi, Kawagoe (JP); Yuji Arase, Tokyo (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 177 days.

(21) Appl. No.: 13/961,228

(22) Filed: Aug. 7, 2013

(65) Prior Publication Data

US 2014/0041522 A1 Feb. 13, 2014

(30) Foreign Application Priority Data

Aug. 8, 2012 (JP) ................................. 2012-175652

(51) Int. Cl.
*F02M 25/08* (2006.01)
*F02M 33/02* (2006.01)
*B01D 53/04* (2006.01)

(52) U.S. Cl.
CPC ............... *F02M 33/02* (2013.01); *B01D 53/04* (2013.01); *F02M 25/0854* (2013.01); *B01D 2259/4516* (2013.01)

(58) Field of Classification Search
CPC ... F02M 25/0854; F02M 33/02; B01D 53/04; B01D 2259/4516; B01D 2259/4566
USPC .......................... 96/121, 131; 95/146; 123/519
See application file for complete search history.

(56) References Cited

U.S. PATENT DOCUMENTS

| | | | | |
|---|---|---|---|---|
| 5,207,808 A * | 5/1993 | Haruta et al. | .................... | 96/131 |
| 5,564,398 A * | 10/1996 | Maeda et al. | ................. | 123/520 |
| 5,641,344 A * | 6/1997 | Takahashi et al. | .............. | 96/139 |
| 7,462,224 B2 * | 12/2008 | Wolff | .............................. | 96/132 |
| 2002/0124732 A1* | 9/2002 | Hara et al. | ...................... | 96/131 |
| 2011/0315126 A1 | 12/2011 | Yoshida et al. | | |

FOREIGN PATENT DOCUMENTS

| | | | |
|---|---|---|---|
| JP | 2008-106610 A | 5/2008 | |
| JP | 2012-007501 A | 1/2012 | |

* cited by examiner

*Primary Examiner* — Frank Lawrence
(74) *Attorney, Agent, or Firm* — Foley & Lardner LLP (57) ABSTRACT

A canister is provided with a plurality of adsorbent chambers filled with adsorbent, and the adsorbent chambers are connected together so as to form a U-turn-shaped passage. The canister has a communication chamber through which both end portions of adjacent two adsorbent chambers communicate with each other; a middle chamber formed at the end portion of one of the adjacent two adsorbent chambers, which is positioned at a downstream side of the communication chamber, and connected to the communication chamber through a communication hole; a baffle plate set in the middle chamber with the baffle plate facing to the communication hole so that an incoming air flow from the communication hole strikes against the baffle plate and diffuses in the middle chamber; and a tubular portion protruding in the communication chamber from an opening edge of the communication hole along a longitudinal direction of the one adsorbent chamber.

4 Claims, 7 Drawing Sheets

CANISTER

BACKGROUND OF THE INVENTION

The present invention relates to a canister used for an evaporative fuel treatment device of a vehicle, and more particularly to a canister having a structure of a series of flow passages which is formed by connecting a plurality of adsorbent chambers together to form a U-turn-shaped flow passage.

As a well-known technique, in a vehicle using an engine, in order to prevent evaporated fuel (or evaporative fuel) in a fuel tank from being released into the atmosphere, an evaporative fuel treatment device having a canister as a main component is provided.

With respect to the canister, an adsorbent such as an activated carbon fills an inside of a casing of the canister. The canister has the function of adsorbing, by the adsorbent, the evaporated fuel generated from the fuel tank in an engine halt state, and desorbing the evaporated fuel from the adsorbent and introducing it into an intake system of the engine by the atmospheric air introduced from an air port (also called a drain port) at engine start-up or in an engine operating state.

Since it is necessary for such canister to secure a sufficient length of a flow passage from a charge port and a purge port, which are provided at one end portion of the canister, to the air port which is provided at the other end portion, i.e. a sufficient length in a flow direction of the adsorbent, a structure in which two or three separate adsorbent chambers are connected in order so as to form a U-turn-shaped flow passage is generally employed, as disclosed in Japanese Patent Provisional Publication No. 2012-007501 (hereinafter is referred to as "JP2012-007501"). In an example shown in FIG. 4 in JP2012-007501, a canister has three adsorbent chambers. A first adsorbent chamber and a second adsorbent chamber, which are positioned at a charge port side, are fixedly connected to each other as one unit by a case, and communicate with each other by a communication passage formed at a part of the case. Then, a third adsorbent chamber is formed by a different case, and one end of the third adsorbent chamber and one end of the second adsorbent chamber are connected together through an external pipe such as flexible rubber tube.

On the other hand, Japanese Patent Provisional Publication No. 2008-106610 (hereinafter is referred to as "JP2008-106610") discloses a structure in which a baffle plate is provided in an opposing position to the air port in order that the atmospheric air coming from the air port widely diffuses upon purging.

SUMMARY OF THE INVENTION

In JP2012-007501, however, in the case of the structure in which the two adsorbent chambers are connected to each other to form the U-turn-shape through the external pipe, parts count increases as compared with the case where the communication passage is formed by a part of the canister case. Further, its assembly process becomes complicated, and also overall dimension of the canister tends to become unnecessarily large due to the connection through the external pipe.

On the other hand, in a case where a communication passage is formed by a part of the case so as to cover both opening portions of the two adsorbent chambers in lieu of this external pipe, there arises a problem that a flow of the air during the purge is shifted to a part, in cross section, of the adsorbent chamber, namely that the air flows on one side of the adsorbent chamber, and therefore the adsorbent can not effectively be purged. That is, the air introduced from the air port by a negative pressure applying from the purge port side flows on one side, i.e. at an inward side, in the U-turn-shaped flow passage so that an air flow length becomes shortest. As a consequence, in the adsorbent chamber positioned at a downstream side (in a direction of the air flow during the purge) of the U-turn flow passage, the air flow is shifted to a part, in cross section, of the adsorbent chamber.

Here, even if the baffle plate as disclosed in JP2008-106610 is provided in the communication passage at an end portion of the adsorbent chamber, the air flow flowing at the inward side in the U-turn flow passage does not flow in a direction perpendicular to the baffle plate, but flows in a slanting direction. Because of this, a diffusion effect by the baffle plate is lessened, and it is impossible to widely diffuse the air flow in the adsorbent chamber.

It is therefore an object of the present invention to provide a canister having a flow passage connecting structure which is capable of widely diffusing the air flow in the adsorbent chamber during the purge without using the external pipe for the connection of the U-turn-shaped flow passage.

According to one aspect of the present invention, a canister in which a plurality of adsorbent chambers filled with an adsorbent are connected in order, so as to form a U-turn-shaped flow passage and a charge port and a purge port are provided at one end of the flow passage and an air port is provided at the other end of the flow passage, the canister comprises: a communication chamber through which both end portions of adjacent two adsorbent chambers communicate with each other, the communication chamber being formed by a part of a canister casing; a middle chamber that is formed at the end portion of one of the adjacent two adsorbent chambers which is positioned at a downstream side, in a direction of an air flow from the air port to the purge port, of the communication chamber, the middle chamber being defined between the adsorbent of the one adsorbent chamber and the communication chamber and being connected to the communication chamber through a communication hole whose opening area is smaller than a cross-sectional area of the flow passage of the middle chamber; a baffle plate that is set in the middle chamber with the baffle plate facing to the communication hole so that an incoming air flow from the communication hole strikes against the baffle plate and diffuses in the one adsorbent chamber; and a tubular portion that protrudes in the communication chamber from an opening edge of the communication hole along a longitudinal direction of the one adsorbent chamber.

In the canister having the above structure, upon the purge, the incoming air flow from the air port flows into the communication chamber after passing through the air port side adsorbent chamber, and further flows into the next adsorbent chamber. At this time, the air is guided in and by the tubular portion and flows straight, then strikes against the baffle plate vertically. The air consequently widely diffuses in the middle chamber, and reaches to the adsorbent in the adsorbent chamber. The purge of the adsorbent in the adsorbent chamber is thus effectively performed.

According to another aspect of the present invention, the canister casing has a body in which the adjacent two adsorbent chambers are arranged and their both end portions open, and the communication chamber is formed by fixing a communication chamber cover to the body of the canister casing.

The body and the communication chamber cover are formed by, for instance, synthetic resin. And the communication chamber cover is fixed to the body by, for instance, by vibration welding.

According to a further aspect of the present invention, a top end portion of the tubular portion has an obliquely-cut shape so as to open toward the end portion of the other of the adjacent two adsorbent chambers which is positioned at an upstream side, in the direction of the air flow, of the communication chamber.

Since the top end portion of the tubular portion opens obliquely, the air flow coming along a U-turn route can be surely guided in a straight line. It is therefore possible to obtain an effect of the diffusion of the air flow even if a length of the tubular portion is set to be relatively short.

According to a still further aspect of the present invention, a first adsorbent chamber having the charge port and the purge port, a third adsorbent chamber having the air port and a second adsorbent chamber positioned between the first and third adsorbent chambers are provided, and the second adsorbent chamber and the third adsorbent chamber communicate with each other through the communication chamber.

According to the present invention, since the two adsorbent chambers are connected together without using the external pipe and the communication chamber is formed by a part of the canister casing, there is advantage in parts count and in assembly process. Further, since the air flow widely diffuses and flows in the adsorbent chamber upon the purge by a combination of the baffle plate and the tubular portion without shifting to a part, in cross section, of the adsorbent chamber, the purge of the adsorbent can be effectively performed.

The other objects and features of this invention will become understood from the following description with reference to the accompanying drawings.

DETAILED DESCRIPTION OF THE INVENTION

Embodiments of the present invention will be explained below with reference to the drawings.

Figure 1:
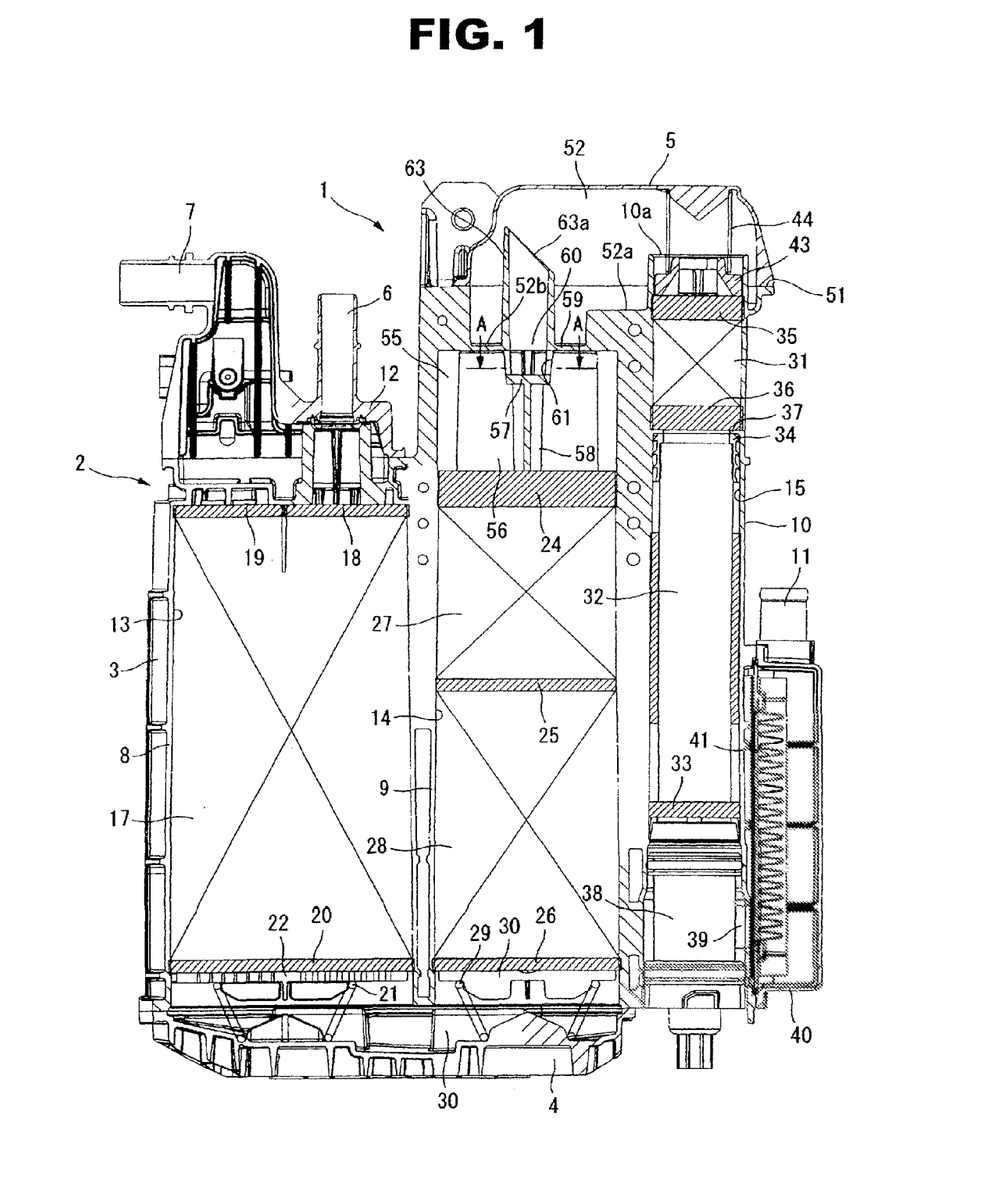
FIG. 1 is a sectional view of a canister according to the present invention.
Figure 2:
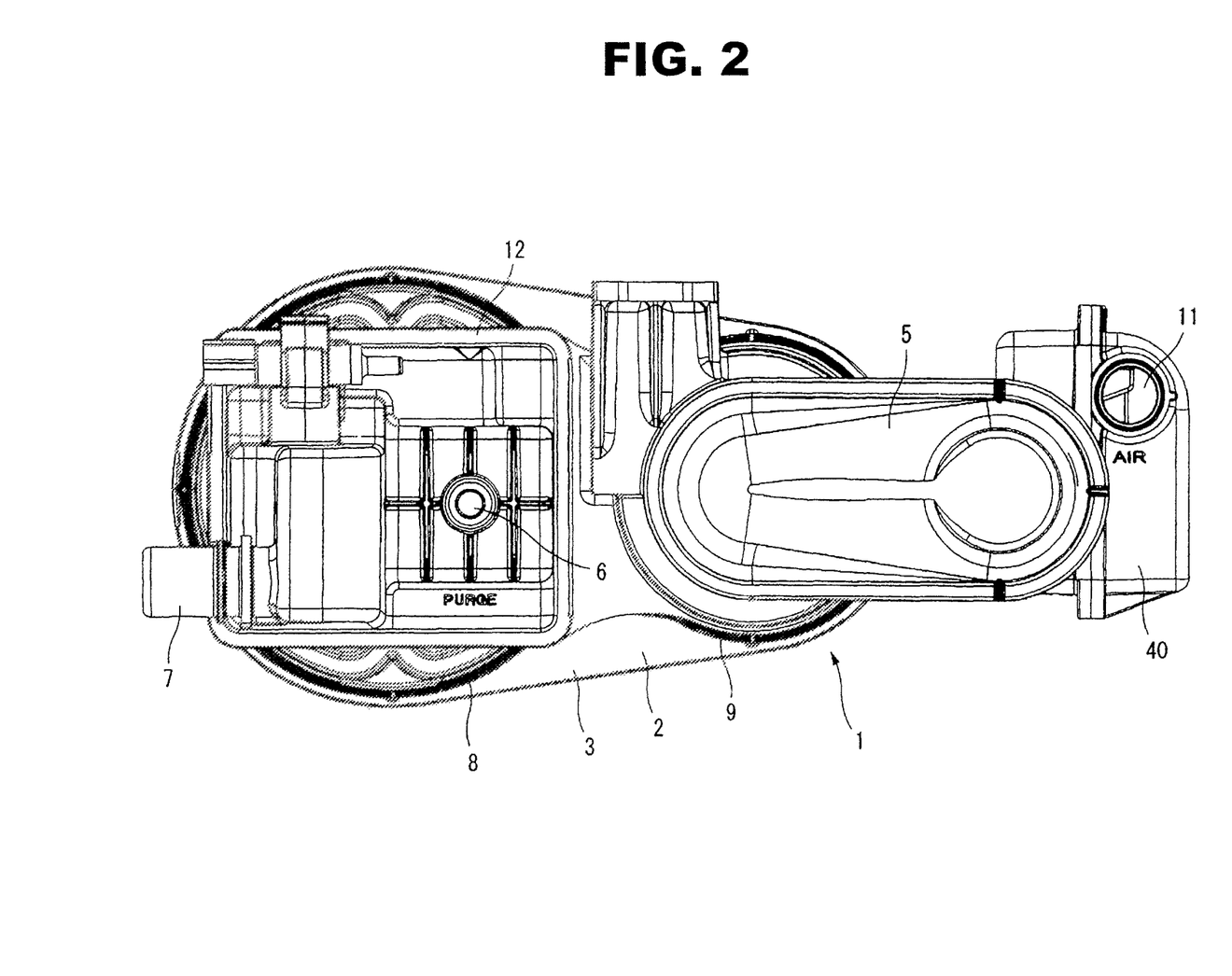
FIG. 2 is a top view of the canister.

FIG. 1 is a longitudinal cross section of a canister 1 of the present invention, cut along a flow passage in the canister 1. FIG. 2 is a top view of the canister 1. Here, the canister 1 is not necessarily mounted in a vehicle in an installation direction as shown in FIG. 1. In the following description, the terms "upper" and "lower" are used for purposes of locating one element relative to another and easily understanding the location of the element, and these are not to be construed as limiting terms. The terms "upper" and "lower" are defined according to a direction of the installation position of the canister 1 in FIG. 1.

The canister 1 has a synthetic resin casing 2. The casing 2 is formed mainly from a body 3 whose lower end opens, an end portion cover 4 that is fixed to the opening end of the body 3 and a communication chamber cover 5 that is fixed to an upper end portion of the body 3 to form a flow passage connecting structure which is a main part of the present invention. Each of the end portion cover 4 and the communication chamber cover 5 is welded to the body 3 by vibration welding.

The body 3 has a first cylinder portion 8, a second cylinder portion 9 that is contiguous to the first cylinder portion 8 and a third cylinder portion 10 that is positioned at an opposite side to the first cylinder portion 8 and is contiguous to the second cylinder portion 9. These first to third cylinder portions 8, 9 and 10 are connected as one unit. As can be seen in FIG. 1, the first cylinder portion 8 is provided, at an upper end thereof, with a purge port 6 and a charge port 7 with these ports 6 and 7 being adjacent to each other. Further, the third cylinder portion 10 is provided, on a lower side surface thereof, with an air port 11. The purge port 6 and the charge port 7 are formed by welding a molded synthetic resin purge/charge port cover 12 to the body 3 by vibration welding. Each lower end of the first cylinder portion 8 and the second cylinder portion 9 opens, and the end portion cover 4 is fixed to the body 3 so as to cover the both these lower ends altogether.

A diameter of the second cylinder portion 9 is smaller than that of the first cylinder portion 8, and a diameter of the third cylinder portion 10 is even smaller than that of the second cylinder portion 9. That is, the diameters become smaller in order of the first cylinder portion 8, the second cylinder portion 9 and the third cylinder portion 10. A first adsorbent chamber 13, a second adsorbent chamber 14 and a third adsorbent chamber 15 are formed by these first cylinder portion 8, second cylinder portion 9 and third cylinder portion 10 respectively.

The first adsorbent chamber 13 is filled with a granular adsorbent 17 (e.g. activated carbon) that can adsorb and desorb fuel component (hydrocarbon). More specifically, a porous screen member 18 and a porous screen member 19, which separate off the first cylinder portion 8 from the purge port 6 and from the charge port 7 respectively, are set at the upper end of the first cylinder portion 8. Also, a porous screen member 20 is set at the lower end of the first cylinder portion 8. The granular adsorbent 17 is then filled between these screen members 18, 19 and 20. The lower end screen member 20 is supported by a perforated plate 22 that is forced by a spring 21, and thus holding or retaining the adsorbent 17 in a proper compression state.

Likewise, as shown in FIG. 1, the second cylinder portion 9 is provided with screen members 24, 25 and 26, and the second adsorbent chamber 14 is filled with granular adsorbents 27 and 28 through these screen members 24, 25 and 26. The granular adsorbents 27 and 28 are held in a proper compression state by a spring 29 and a perforated plate 30 provided at the lower end of the second cylinder portion 9. The second adsorbent chamber 14 is partitioned off into two chambers by the middle screen member 25, and the adsorbents 27 and 28 fill the two chambers separately.

A lower end of the first adsorbent chamber 13 and a lower end of the second adsorbent chamber 14 communicate with each other through a communication passage 30 that is formed by the end portion cover 4.

As for the third adsorbent chamber 15 formed by the third cylinder portion 10 and having the smallest diameter, its upper portion is filled with a granular adsorbent 31, while its lower portion is filled with a columnar honeycomb adsorbent 32. This honeycomb adsorbent 32 is shaped into a columnar shape using an adsorbent material such as the activated carbon, and a number of microporous passage holes are formed into a honeycomb shape along a longitudinal direction of FIG. 1. The honeycomb adsorbent 32 is held between a lower side porous screen member 33 and a cylindrical rubber packing 34 that is positioned at an upper side of the honeycomb adsorbent 32. The upper side granular adsorbent 31 is filled between two screen members 35 and 36 which are positioned above the packing 34. The screen member 35 is forced by a retainer 43 whose middle is open and a spring 44 in an axial direction, and thus giving a proper compression force to the adsorbent 31.

Here, in the drawing, for positioning of the screen member 36 and the packing 34 in the axial direction, a ring-shaped stopper wall 37 that extends in an inward direction from an inner circumferential surface of the third cylinder portion 10 is provided. Thus, the granular adsorbent 31 etc. is assembled from an upper side of FIG. 1, while the honeycomb adsorbent 32 is assembled from a lower side of FIG. 1.

A cylindrical solenoid valve 38 that closes a flow passage between the air port 11 and a lower end of the honeycomb adsorbent 32 as necessary is installed at a lower side of the honeycomb adsorbent 32. More specifically, an opening portion 39 through which the air port 11 and an inside of the third adsorbent chamber 15 communicate with each other is formed at a side of an installation position of the solenoid valve 38 on a side wall of the third cylinder portion 10, then the solenoid valve 38 opens/closes a passage between the opening portion 39 and the lower end of the honeycomb adsorbent 32.

A substantially rectangular synthetic resin air port cover 40 is welded to a side surface of the body 3 (the third cylinder portion 10) by vibration welding so as to cover the opening portion 39. The air port 11 is provided at an upper end of this air port cover 40. The air port cover 40 is provided, at an inner side thereof, with a filter 41 that is made of a pleated filter paper or a pleated nonwoven fabric formed by being folded over repeatedly, so as to separate the air port 11 and the opening portion 39.

An upper end of the third adsorbent chamber 15 and an upper end of the second adsorbent chamber 14 communicate and is connected with each other by the flow passage connecting structure (described later) including the communication chamber cover 5.

In the canister 1 having the above structure, the three chambers of the first adsorbent chamber 13, the second adsorbent chamber 14 and the third adsorbent chamber 15 are connected substantially as one flow passage. Then, the purge port 6 and the charge port 7 are positioned at one end, in flow direction, of this flow passage, and the air port 11 is positioned at the other end of this flow passage. The charge port 7 is connected to a head space of a fuel tank (not shown) of the vehicle, and the purge port 6 is connected to an intake system of an engine (both not shown). The air port 11 opens in the atmosphere, directly or through a certain device or pipe.

Evaporated fuel (or evaporative fuel) generated from the fuel tank, for instance, in an engine halt state or during the refueling is introduced into the canister 1 from the charge port 7, and is adsorbed by each adsorbent while flowing in each chamber from the first adsorbent chamber 13 toward the third adsorbent chamber 15. This adsorbed evaporated fuel (fuel component) is desorbed from the adsorbent (the adsorbent is purged) with the atmospheric air introduced from the air port 11 by a negative pressure generated in the intake system of the engine in an engine operating state, and flows into the engine intake from the purge port 6, then finally is burned in the engine.

In this manner, the canister 1 repeats the adsorption/purge of the evaporated fuel. However, in order that the fuel component does not leak from the air port 11 upon the adsorption, it is necessary for the canister 1 to secure a substantial, sufficiently long, length of the flow passage from the charge port 7 up to the air port 11. For this reason, the canister 1 of the present embodiment employs the structure in which the three separated adsorbent chambers 13, 14 and 15 are provided and these adsorbent chambers are connected in order, so as to form a U-turn-shaped flow passage.

Next, the flow passage connecting structure, which is the main part of the present invention, between the second adsorbent chamber 14 and the third adsorbent chamber 15 will be explained.

Figure 3:
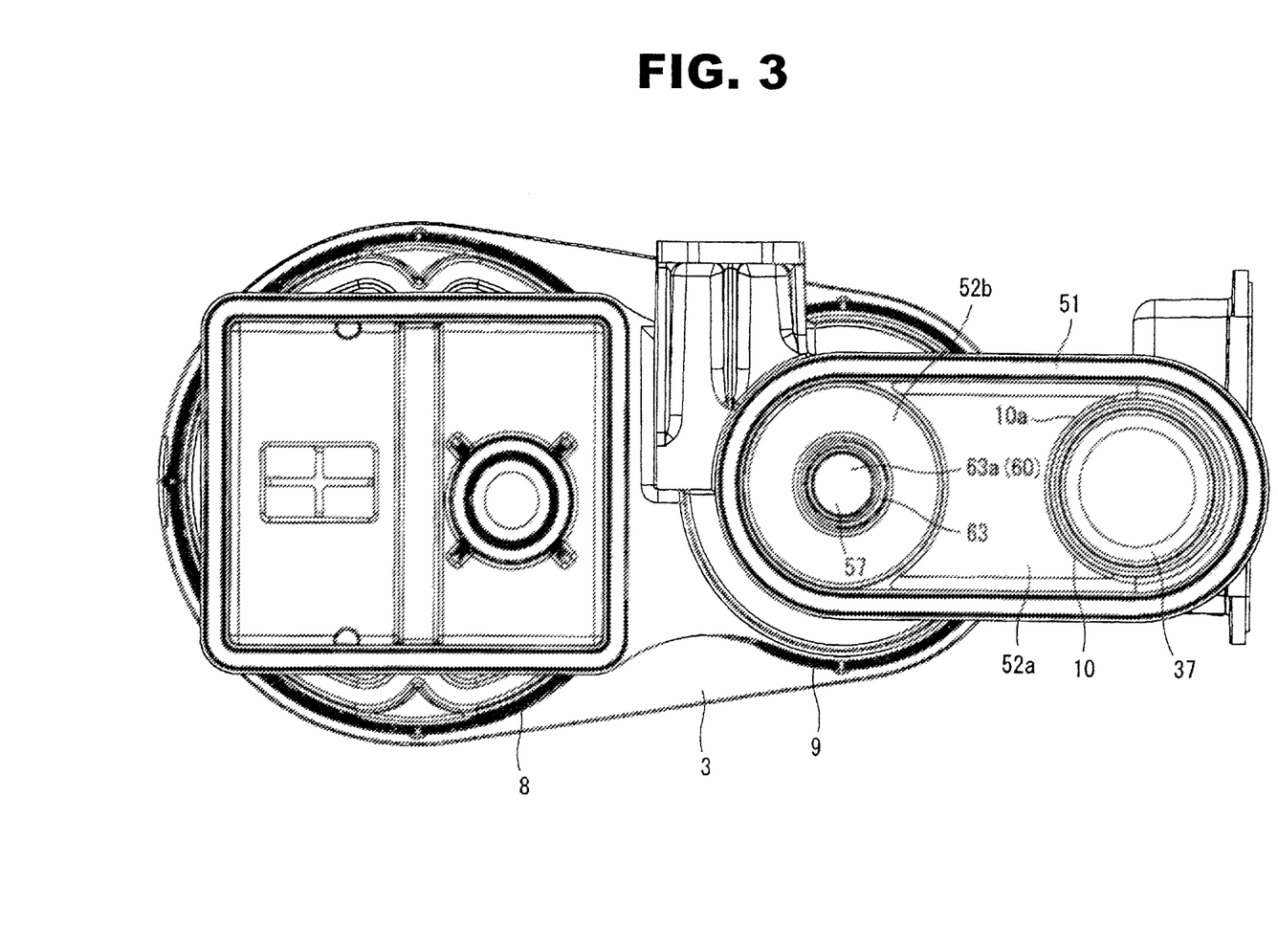
FIG. 3 is a top view showing an end portion of a body of the canister with a communication chamber cover removed.

As shown in FIGS. 1 and 2, the communication chamber cover 5, which is fixed to the upper end portion of the body 3 so as to extend from an upper end of the second cylinder portion 9 to an upper end of the third cylinder portion 10 and cover both these upper ends, is formed into an elliptical dome shape viewed from above. The communication chamber cover 5 is welded, by vibration welding, to a flange 51 of the body 3 which is formed into an elliptical shape as shown in FIG. 3. A communication chamber 52 is then formed between the body 3 and the communication chamber cover 5 by this dome-shaped communication chamber cover 5.

An upper end portion of the third adsorbent chamber 15, i.e. an upper end portion 10a of the third cylinder portion 10, cylindrically extends from a first bottom wall surface 52a of the communication chamber 52 in the communication chamber 52. Here, an inside diameter of this extending portion is substantially the same as that of a portion of the chamber filled with the adsorbent 31, and the both portions form a continuous surface without an uneven part.

On the other hand, the upper end portion of the second cylinder portion 9 is provided with a number of ribs 55. Then, the screen member 24 is positioned by these ribs 55 in the axial direction, and a middle chamber 56 is formed or defined at an upper side of the screen member 24. This middle chamber 56 is a space in which there is no adsorbent, and has a cylindrical shape whose diameter is substantially the same as those of the lower side chambers filled with the adsorbents 27 and 28.

Figure 4:
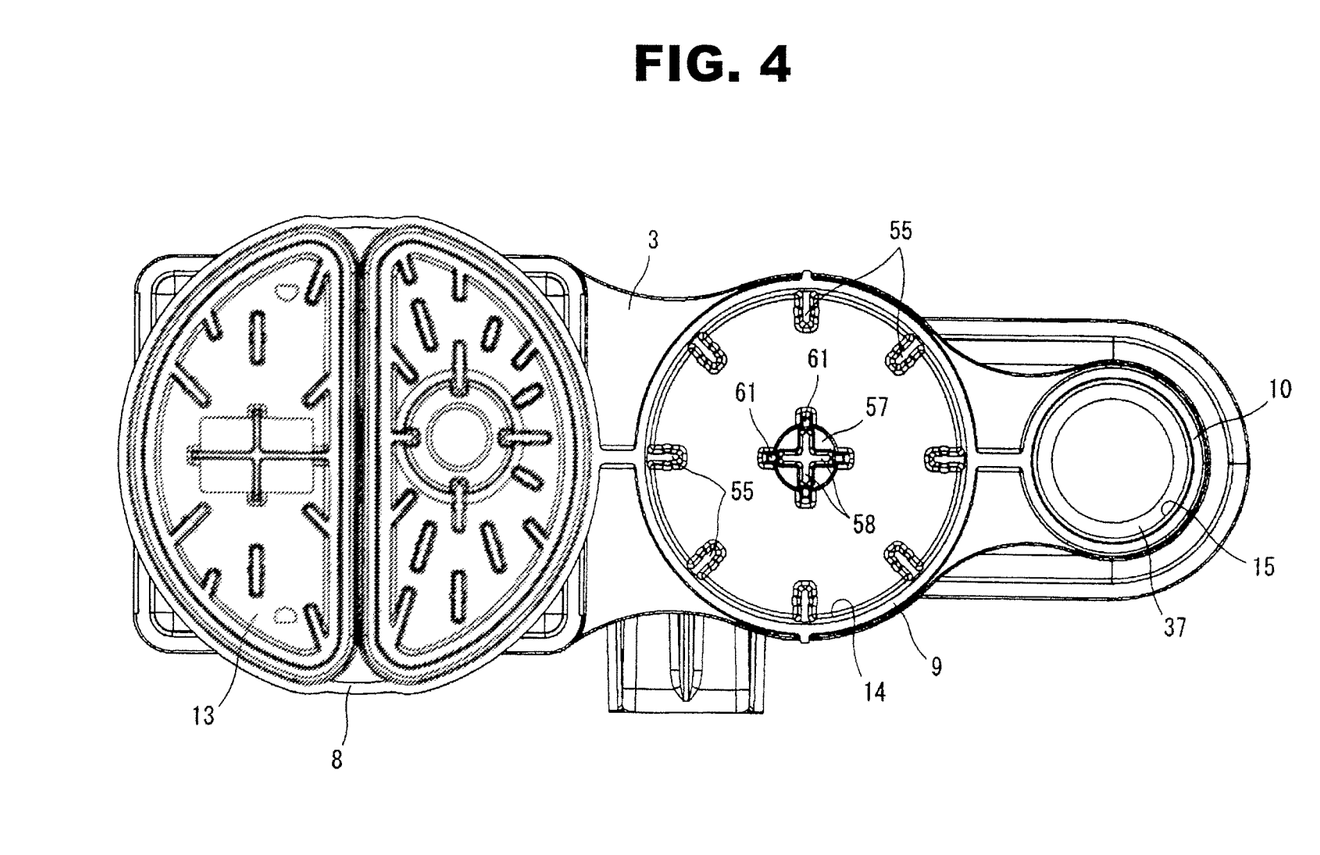
FIG. 4 is a bottom view showing an inside of the body of the canister with an end portion cover removed.

FIG. 4 is a drawing showing the body 3 as one unit before fixing the end portion cover 4 to the body 3, when viewed from a lower side. As shown in FIG. 4, the ribs 55 are radially formed at an inner circumference of the second cylinder portion 9, and each extend in the axial direction of the second cylinder portion 9.

Further, four ribs 58 (in FIG. 4, these ribs form a cross-shape) also extend in the axial direction of the second cylinder portion 9 from an undersurface of a middle baffle plate 57 (described later), and support a middle portion of the screen member 24.

An upper end of the middle chamber 56 is partitioned off by an end portion wall 59 that defines a second bottom wall surface 52b of the communication chamber 52, and a circular communication hole 60 whose diameter (opening area) is smaller than a diameter (a flow passage cross-sectional area) of the middle chamber 56 opens at the middle of the end portion wall 59. This end portion wall 59, i.e. the second bottom wall surface 52b, is positioned at a lower side with respect to the first bottom wall surface 52a, and as is clear from FIGS. 1 and 3, the second bottom wall surface 52b has a depressed circular shape with respect to the first bottom wall surface 52a.

Figure 5:
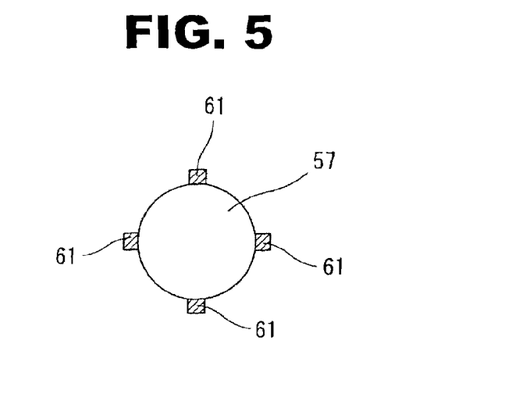
FIG. 5 is a sectional view taken along a plane A-A of FIG. 1, which shows a baffle plate.

The above-mentioned baffle plate 57 is set in a lower position of the communication hole 60 with the baffle plate 57 facing to the communication hole 60. As shown in FIG. 5, this baffle plate 57 is a circular plate whose diameter is substantially same as that of the communication hole 60, and is supported by the end portion wall 59 through four thin leg portions 61 at four points of a circumference of the baffle plate 57. The baffle plate 57 is positioned at an upper part of the middle chamber 56 with the baffle plate 57 being orthogonal to a center axis (not shown) of the second cylinder portion 9 which passes through the communication hole 60.

Each portion between adjacent two of the four leg portions 61 forms a substantially rectangular opening which opens toward the middle chamber 56. In other words, the position of the baffle plate 57 is offset from the communication hole 60 to the lower side, then each area of the substantially rectangular opening formed between the leg portion 61 and the baffle plate 57 in the axial direction becomes a substantial or an actual flow passage. With this structure, an air flow flowing from the communication hole 60 to an inside of the middle chamber 56 collides with or strikes against the baffle plate 57. The air flow (an incoming air flow) consequently diffuses and is guided in a radial direction.

On the other hand, a tubular portion 63, which extends upwards along the axial direction (a longitudinal direction) of the second cylinder portion 9 from an opening edge of the communication hole 60, is formed in an upper position of the communication hole 60. This tubular portion 63 is a cylinder having the substantially same inside diameter as that of the communication hole 60. As shown in FIG. 1, the tubular portion 63 extends upwards with respect to the first bottom wall surface 52a and the flange 51 (a connection between the communication chamber cover 5 and the body 3) and protrudes in the communication chamber 52.

An upper end portion of the tubular portion 63 has an obliquely-cut shape (has a shape cut in a slanting direction) so as to open toward the upper end portion 10a of the third cylinder portion 10. In FIG. 1 shown as an example, a top end portion of the tubular portion 63 has an inclination of e.g. about 45 degree. With this shape, a top end opening 63a has an oval opening shape and opens in oblique upward direction.

Here, although an optimum protruding length or an optimum inclination angle of the tubular portion 63 differs according to various conditions such as an estimated flow velocity of a purge air, for instance, the tubular portion 63 shown in FIG. 1 is set as follows; a height position of the inclined oval-shaped top end opening 63a is substantially equal to a height position of an opening edge of the upper end portion 10a of the third cylinder portion 10, and also an uppermost portion of the opening 63a is positioned at an upper side with respect to the opening edge of the upper end portion 10a.

In the present embodiment, the baffle plate 57 and the tubular portion 63 are formed integrally with the body 3 as a part of the molded synthetic resin body 3. However, in the present invention, these components could be separately formed and be fixed with an adhesive.

In the canister 1 having the above structure, upon the purge, the air passing through the third adsorbent chamber 15 flows into the second adsorbent chamber 14 from the upper end of the third adsorbent chamber 15 through the communication chamber 52. At this time, although the air flow flows so as to make U-turn in the communication chamber 52, since the tubular portion 63 extending straight along the center axis of the second adsorbent chamber 14 exists in the upper position of the communication hole 60, i.e. at an entry side of the second adsorbent chamber 14, the air flow is guided in a straight line by the tubular portion 63 and consequently collides with or strikes against the baffle plate 57 vertically. Accordingly, the air flow widely diffuses in the middle chamber 56 (the second adsorbent chamber 14), then the purge of the adsorbents 27 and 28 in the second adsorbent chamber 14 is effectively performed. In particular, since the top end opening 63a of the tubular portion 63 has the obliquely-cut shape so as to open toward the upper end portion 10a of the third cylinder portion 10, the air can flow into the tubular portion 63 more smoothly. Hence, the air flow can be guided so as to strike against the baffle plate 57 vertically without unduly elongating a length of the tubular portion 63.

Figure 6:
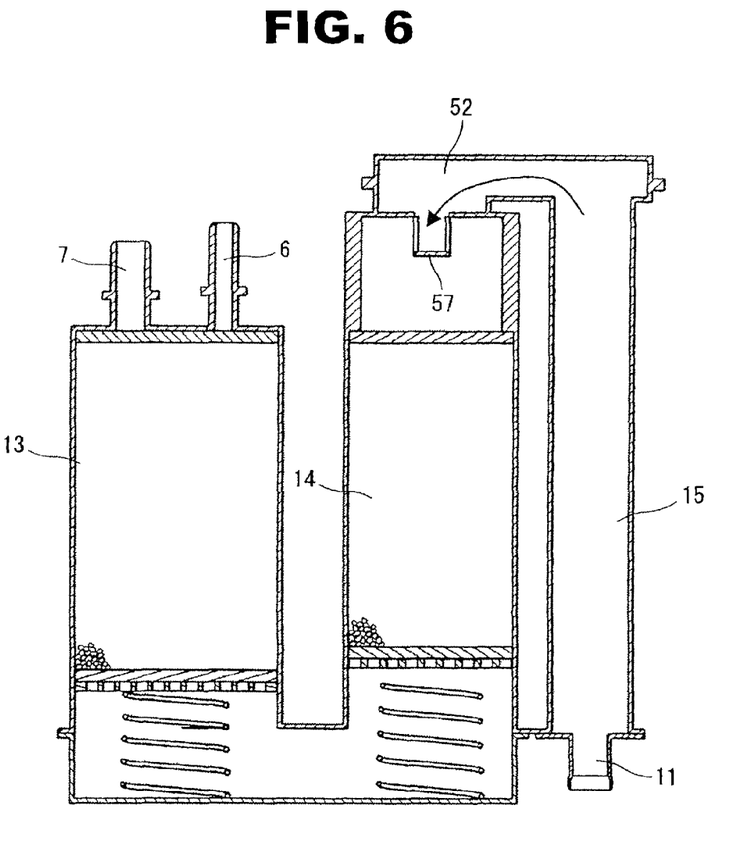
FIG. 6 is a drawing for explaining a flow of the atmospheric air upon purging in a comparative example.

FIG. 6 is a drawing of a comparative example for explaining the air flow in the communication chamber 52 in a case where there is no tubular portion 63. When the air flows in the communication chamber 52 by the negative pressure generated in the intake system of the engine, the air flow has a tendency to flow along a shortest route from an upper end opening of the third adsorbent chamber 15 toward an upper end opening of the second adsorbent chamber 14. Thus, as shown by an arrow in FIG. 6, the air flows in an inward side of the U-turn-shaped flow passage, and as a consequence the air flows into the upper end opening of the second adsorbent chamber 14 in a slanting direction. Therefore, the air flow is shifted to a part, in cross section, of the second adsorbent chamber 14, namely that the air flows on one side of the second adsorbent chamber 14, then the adsorbent in the second adsorbent chamber 14 can not effectively be purged. Further, even if the baffle plate 57 is provided with the baffle plate 57 facing to the opening of the second adsorbent chamber 14, since the air flow strikes against the baffle plate 57 in the slanting direction as shown in FIG. 6, an effective diffusion of the air flow can not be performed.

As explained above, in the canister 1 of the present invention, by employing the structure in which the baffle plate 57 and the tubular portion 63 are combined, the shift of the air flow in the second adsorbent chamber 14 can be surely prevented.

In addition, since all the components such as the tubular portion 63 and the baffle plate 57 are formed integrally with the body 3 as a part of the body 3 and the flow passage connecting structure is formed only by welding the communication chamber cover 5 to the body 3 by vibration welding, an assembly process can be simplified. Also in a case where the communication chamber cover 5 is fixed to the body 3 with the adhesive in stead of the vibration welding, the same advantage can be gained.

Figure 7:
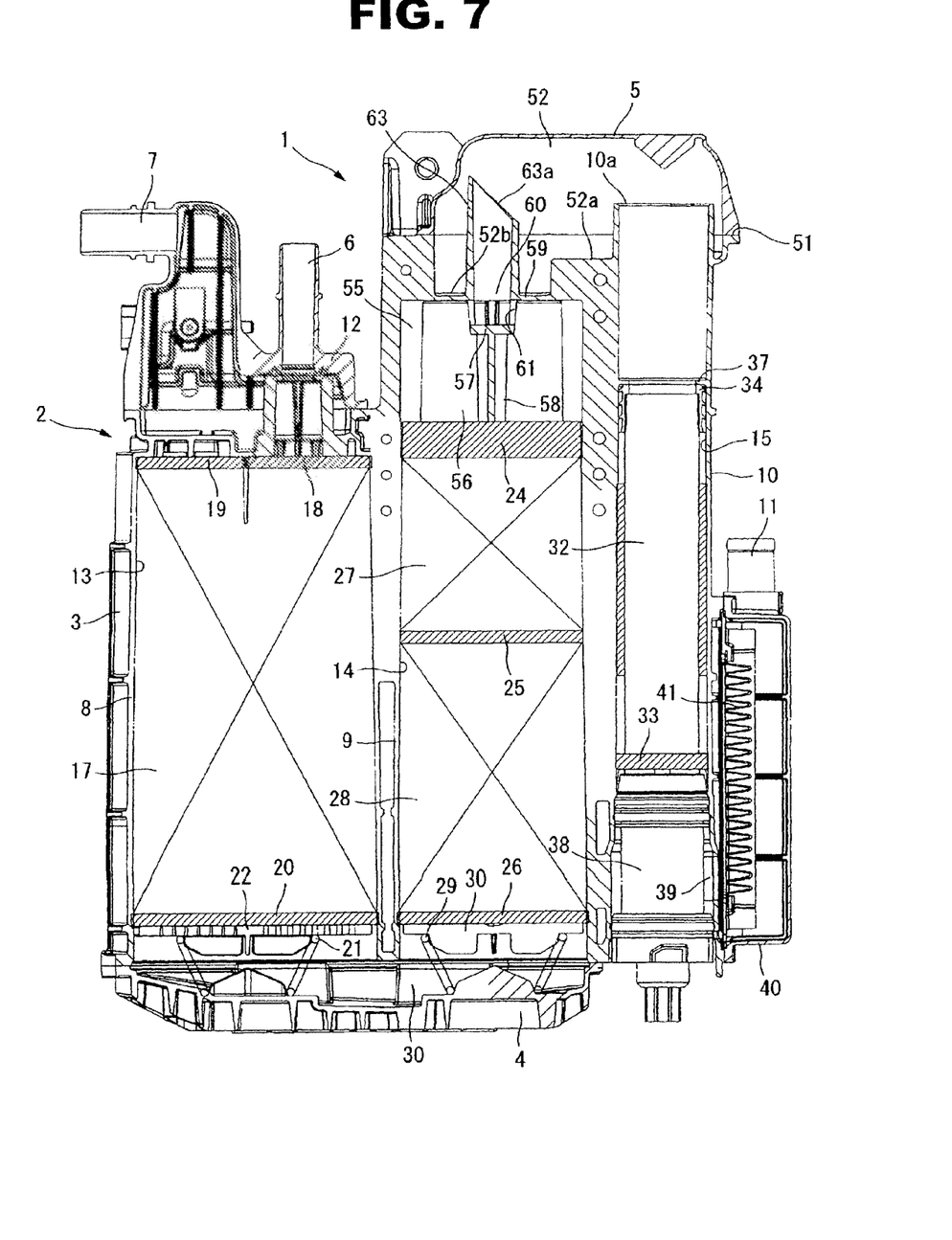
FIG. 7 is a sectional view of a canister of a first modification in which a third adsorbent chamber is provided with only a honeycomb activated carbon.

Next, a first modification will be shown. FIG. 7 is the first modification of the canister 1. In the first modification, the granular adsorbent 31 in the third adsorbent chamber 15 is not provided, and only the honeycomb adsorbent 32 is provided in the third adsorbent chamber 15. With regard to the flow passage connecting structure, it is the same as the above embodiment.

Figure 8:
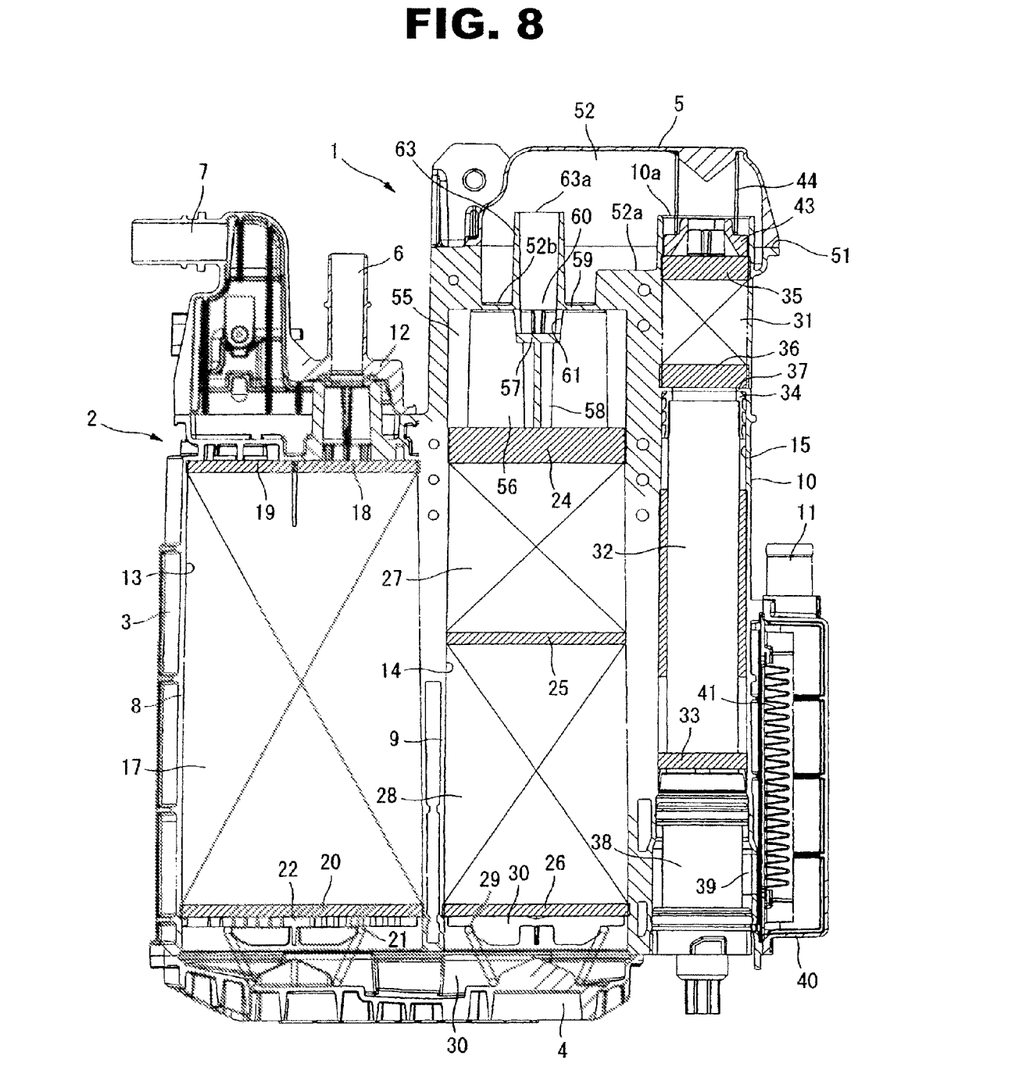
FIG. 8 is a sectional view of a canister of a second modification in which a shape of a top end of a tubular portion is changed.

Next, a second modification will be shown. FIG. 8 is the second modification of the canister 1. In the second modification, the top end portion of the tubular portion 63 is not obliquely cut, and an opening edge of the tubular portion 63 is positioned along a plane orthogonal to the center axis of the second adsorbent chamber 14. That is, the top end opening 63a has a circular shape and opens in an upward direction of FIG. 1 along the center axis of the second adsorbent chamber 14.

In each of the embodiment and modifications explained above, a structure of a flow passage between the first adsorbent chamber 13 and the second adsorbent chamber 14 has the communication passage 30 formed by merely fixing the end portion cover 4, and the above flow passage connecting structure is not employed. The reason is that each cross-sectional area of the flow passage of the first adsorbent chamber 13 and the second adsorbent chamber 14 is large, and an influence of the shift of the air flow upon the purge is relatively small (as compared with the connection between the second adsorbent chamber 14 and the third adsorbent chamber 15). However, the flow passage connecting structure can be applied to the connection between the first adsorbent chamber 13 and the second adsorbent chamber 14.

The entire contents of Japanese Patent Application No. 2012-175652 filed on Aug. 8, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A canister in which a plurality of adsorbent chambers filled with an adsorbent are connected in order, so as to form a U-turn-shaped flow passage and a charge port and a purge port are provided at one end of the flow passage and an air port is provided at the other end of the flow passage, the canister comprising:
    a communication chamber through which both end portions of adjacent two adsorbent chambers communicate with each other, the communication chamber being formed by a part of a canister casing;
    a middle chamber that is formed at the end portion of one of the adjacent two adsorbent chambers which is positioned at a downstream side, in a direction of an air flow from the air port to the purge port, of the communication chamber, the middle chamber being defined between the adsorbent of the one adsorbent chamber and the communication chamber and being connected to the communication chamber through a communication hole whose opening area is smaller than a cross-sectional area of the flow passage of the middle chamber;
    a baffle plate that is set in the middle chamber with the baffle plate facing to the communication hole so that an incoming air flow from the communication hole strikes against the baffle plate and diffuses in the middle chamber; and
    a tubular portion that protrudes in the communication chamber from an opening edge of the communication hole along a longitudinal direction of the one adsorbent chamber.

2. The canister as claimed in claim 1, wherein:
the canister casing has a body in which the adjacent two adsorbent chambers are arranged and their both end portions open, and
the communication chamber is formed by fixing a communication chamber cover to the body of the canister casing.

3. The canister as claimed in claim 1, wherein:
a top end portion of the tubular portion has an obliquely-cut shape so as to open toward the end portion of the other of the adjacent two adsorbent chambers which is positioned at an upstream side, in the direction of the air flow, of the communication chamber.

4. The canister as claimed in claim 1, wherein:
a first adsorbent chamber having the charge port and the purge port, a third adsorbent chamber having the air port and a second adsorbent chamber positioned between the first and third adsorbent chambers are provided, and
the second adsorbent chamber and the third adsorbent chamber communicate with each other through the communication chamber.

* * * * *